(12) United States Patent
Barber

(10) Patent No.: US 6,240,175 B1
(45) Date of Patent: May 29, 2001

(54) INTELLIGENT PHONE CORD APPARATUS

(75) Inventor: James Stewart Barber, Oldwick, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/772,476

(22) Filed: Dec. 23, 1996

Related U.S. Application Data

(63) Continuation of application No. 08/401,843, filed on Mar. 10, 1995, now abandoned.

(51) Int. Cl.[7] ............................. H04M 15/00; H04M 7/00
(52) U.S. Cl. ........................................ 379/355; 379/130
(58) Field of Search .................................. 379/355, 354, 379/356, 216, 196, 207, 221, 111, 114, 130, 142, 88, 88.01

(56) References Cited

U.S. PATENT DOCUMENTS

| | | | |
|---|---|---|---|
| 4,186,279 | * 1/1980 | Face | 179/90 B |
| 4,686,700 | 8/1987 | Perry | 379/183 |
| 4,751,728 | * 6/1988 | Treat | 379/114 |
| 4,769,834 | * 9/1988 | Billinger et al. | 379/196 |
| 4,870,679 | * 9/1989 | Hanna et al. | 379/114 |
| 5,241,590 | 8/1993 | Deakins et al. | 379/356 |
| 5,400,395 | * 3/1995 | Berenato | 379/114 |
| 5,425,085 | * 6/1995 | Weinberger et al. | 379/112 |
| 5,455,858 | * 10/1995 | Lin | 379/355 |
| 5,459,774 | * 10/1995 | Breeden | 379/354 |
| 5,473,681 | * 12/1995 | Parteidge, III | 379/229 |
| 5,519,769 | * 5/1996 | Weinberger et al. | 379/112 |
| 5,530,741 | * 6/1996 | Rubin | 379/142 |
| 5,550,915 | * 8/1996 | Partridge, III | 379/355 |
| 5,978,654 | * 11/1999 | Colwell et al. | 455/31.1 |

* cited by examiner

*Primary Examiner*—Wing F. Chan
(74) *Attorney, Agent, or Firm*—Gibbons, Del Deo, Dolan, Griffinger & Vecchione

(57) ABSTRACT

A telephone cord having an automatic dialer incorporated therein. The telephone cord connects a telephone to a wall jack and includes a line powered dialer circuit. When the associated telephone handset goes off-hook for placement of on outgoing call, a predetermined prefix of numbers is automatically dialed prior to a caller entered number using DTMF tones. A confirmation tone may then be issued to the user. In accordance with another aspect of the present invention, the phone cord and accompanying dialer module include a microprocessor to perform intelligent functions. A caller dialed number is initially trapped and buffered, wherein a modified sequence of numbers is then redialed, if necessary. A prerecorded message or confirmation tone may be issued to the caller while the message is being buffered. In another alternative embodiment, a number recognition program is automatically downloaded from a central office upon power up to assist in automatic dialing of local toll calls. Also an access key can be pressed in order to initiate the dialing sequence, such that the invention may be used on any phone including those utilizing a PBX. A multi-position switch is included for mode selection and to disable the device when desired.

26 Claims, 4 Drawing Sheets

INTELLIGENT PHONE CORD APPARATUS

This application is a continuation of application Ser. No. 08/401,843 filed Mar. 10, 1995, now abandoned.

FIELD OF THE INVENTION

The present invention relates to a phone cord for interconnecting the base of a telephone to a phone jack, and more particularly to a telephone cord that is a adapted to automatically dial a predetermined sequence of numbers.

BACKGROUND OF THE INVENTION

The recent proliferation of independent telecommunications carriers has left the consumer with a multitude of options when placing a long distance or local call. Moreover, now that some long distance carriers offer inter-lata as well as intra-lata telephone services, there is even a wider variety of choices.

It is usually desirable, however, for an individual consumer to want to place the majority of calls with a single carrier, if possible, in order that he or she may take full advantage of discounts associated with a specific calling plan or because the consumer has familiarity and developed a comfort level with, and perhaps brand loyalty to, a specific carrier.

Depending on the geographic location of where a call is originated and terminated, and the carrier which provides the local and long distance telephone service, a predetermined sequence of numbers or a prefix code may have to first be dialed in order to gain access to the services of a specific telecommunications carrier. This is exemplified in the current situation in a number of states where carriers other than the local exchange carrier can be accessed by the customer for intra-lata calls by pre-dialing an alternate carrier access code.

This scheme is at times disadvantageous since a would-be caller may forget to dial the predetermined sequence of numbers or may be in a hurry and feel inconvenienced at having to dial the additional numbers. The resulting call may then be placed with an unintended carrier, wherein the consumer loses out on certain expected benefits, and at the same time may be charged at a higher calling rate than anticipated.

The above hardships would seemingly be eliminated if the intended communications carrier were always able to be automatically dialed upon placement of a call. Automatic dialing apparatus are known in the prior art. For example, U.S. Pat. No. 5,241,590 to Deakins et al. discloses a device for dialing a pre-programmed telephone number wherein the device is inserted between a cord connecting the handset and the body of a telephone. A push button switch on the device activates the redial function of a DTMF tone generator chip which is connected electrically in parallel with the microphone connections of the cord. The Deakins et al. patent, however, does not disclose a device for automatically dialing only a prefix or partial address of numbers in order to access a specific telecommunications carrier.

It is therefore an object of the present invention to provide a simple and cost effective manner for automatically accessing the services of a specific telecommunications provider for both inter-lata and intra-lata calls.

SUMMARY OF THE INVENTION

The present invention is a telephone cord having an automatic dialer incorporated therein. The cord connects a telephone to a wall jack and includes line powered dialer circuitry. When the associated telephone goes off-hook for placement of an outgoing call, an off-hook detector senses the change in line current and/or voltage and immediately couples the phone line to a dial tone detector. If a dial tone is detected, indicating an outgoing call, a predetermined sequence or prefix of numbers is automatically dialed using DTMF tones stored in memory associated with a dialer circuit. In this way a specific telecommunications carrier may be selected for both inter-lata and intra-lata calls.

In accordance with another aspect of the present invention, the phone cord and accompanying dialer circuitry include a microprocessor in order that intelligent functions may be performed. That is, a dialed number is initially trapped and buffered, wherein the number is analyzed to determine if a modified sequence of numbers needs to be dialed. A prerecorded message or confirmation tone may be issued to the caller while the message is being buffered. In another alternative embodiment, a number recognition program is automatically downloaded from a central office upon initial power-up of the dialer circuitry to assist in automatic dialing of local toll calls. Also an access key on the telephone keypad can be pressed in order to initiate the dialing sequence. Accordingly, the invention may be used on any phone including those utilized in PBX switching networks. A multi-position switch is included for mode selection and to disable the device when desired.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

Figure 1:
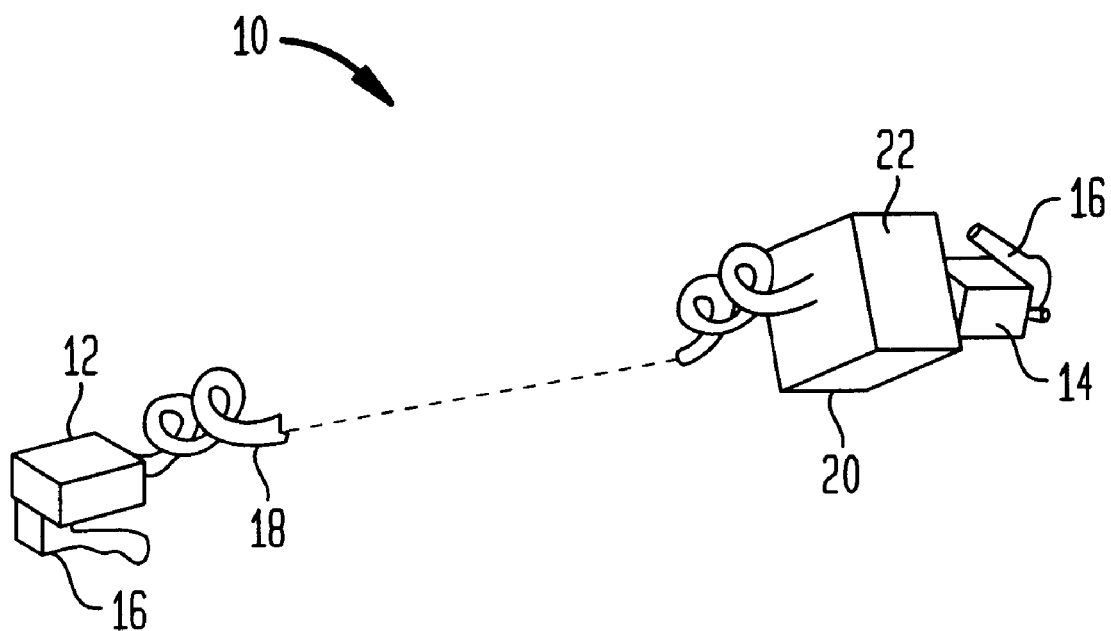
FIG. 1 shows a perspective view of one preferred embodiment of the present invention intelligent phone cord.

Referring to FIG. 1, there is shown one preferred embodiment of the present invention intelligent phone cord 10. In the preferred embodiment the phone cord 10 is intended to connect between the base of a telephone or other communications device and a wall jack or similar receptacle which leads to an outside communications line at a centralized telephone switching office. As such, first and second connectors 12, 14 are disposed at opposite ends of the cord 10. The connectors 12, 14 may be any standard telephone connector adapted to be received into a phone jack, and which include biasing arm 16 or other known means for locking a connector into place. Line cord 18 is coupled into each of the connectors 12, 14 and will include either two or four conductors to thereby provide continuity from one end to another end of the cord. Between the connectors 12, 14 and coupled within the length of the wire 18 is a housing 20 containing a dialer module 22 therein. As can be seen in the shown embodiment, the housing 20 is located proximate the second connector 14 and is dimensioned only slightly larger than the connector itself, thereby providing a relatively unobtrusive addition to an otherwise common phone cord.

Figure 2:
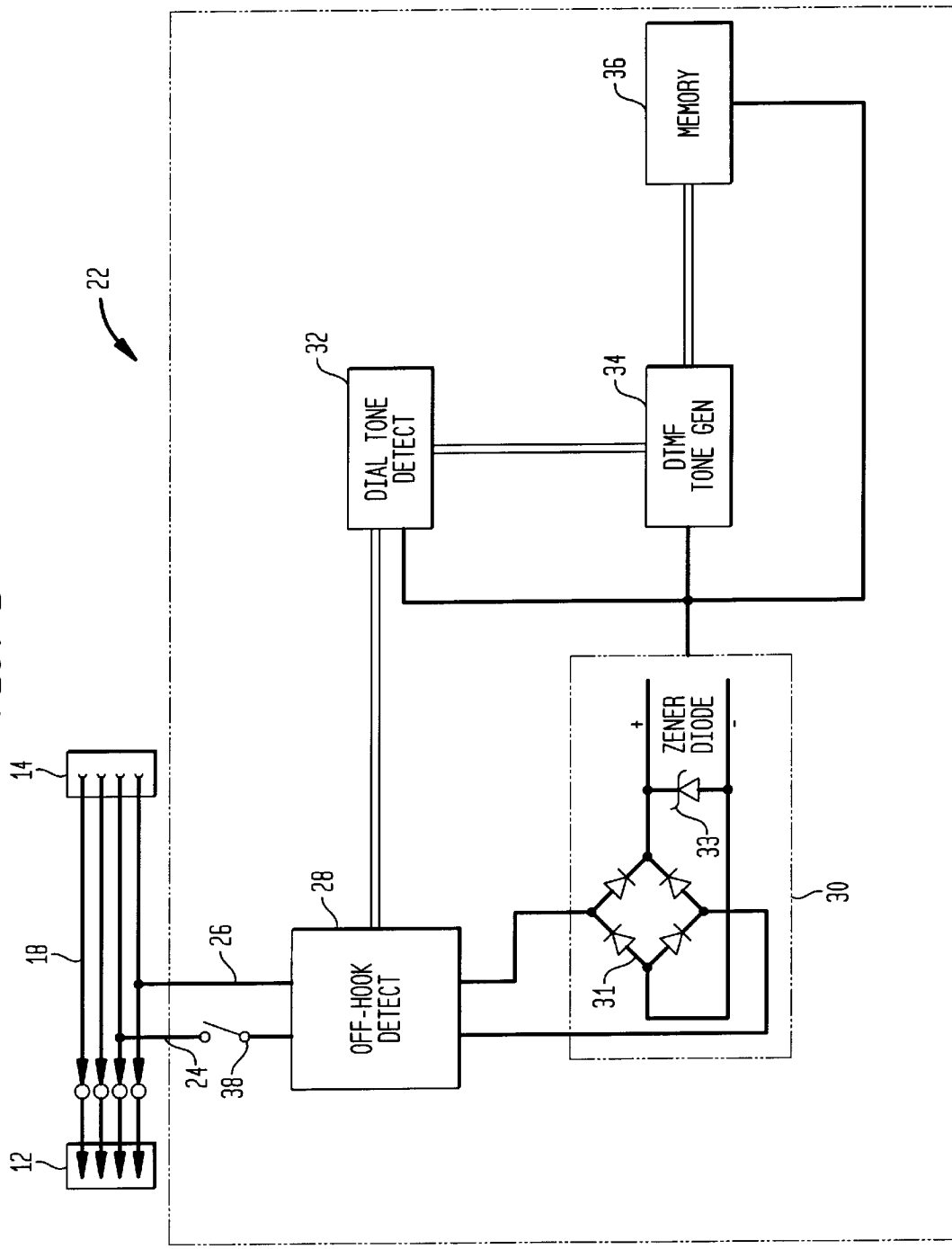
FIG. 2 shows a block diagram of one preferred embodiment of the present invention automatic dialer module.

Referring to FIG. 2, there is shown a block diagram of the dialer module 22 referenced above. The dialer module 22 is electrically coupled in parallel with two conductors 24, 26 of the four conductors shown in the figure. These conductors 24, 26 are tapped into the tip and ring conductors of the telephone line and lead to the input of an off-hook detector 28. The off-hook detector 28 senses a change in line current (to DC) when the handset of a telephone connected to the line goes off-hook and includes a switching means which immediately couples the communication line conductors 24, 26 to a next stage of the dialer module circuit. The use of off-hook detectors is well known. An illustrative example of an off-hook detector incorporating a switching device is disclosed in U.S. Pat. No. 4,686,700 to Perry. Such a circuit allows for detection of an off-hook condition with little actual circuitry. The off-hook detector may also take the form of a high impedance coil used in conjunction with a balanced bridge. It will also be understood, however, that the off-hook detector may be any other circuitry for sensing the presence of a predetermined amount of DC current on the phone line and then activating a switching device in response thereto.

A voltage regulator circuit 30 is coupled through the off-hook detector to provide power from the phone line to the dialer module circuit 22 at times only when the handset is off-hook. In this manner, the signal from any higher voltage ring pulses on the phone line are shielded from the dialer module circuitry when the handset is on-hook. The regulator circuit as depicted is a diode bridge network 31 having a regulating zener diode 33 in parallel therewith. The diode bridge ensures that proper polarity reaches any integrated circuit chips that are used. It will be understood, however, that any other suitable means for providing a regulated predetermined voltage level to the dialer module may be utilized. The regulator may also be coupled directly to the phone line and not through the off-hook detector 28 in order to enable continuous powering of the circuit. Any on-hook power drain greater than, for example 10 mA, however, could generate an off-hook condition at the central office and so on-hook current drain by the dialer module circuitry is a significant concern. By incorporating low power CMOS or other like integrated circuit technology, the dialer module 22 can be made to draw negligible line current that will not affect phone service operation. Preferably the dialer circuit will be incorporated into a single chip application specific integrated circuit (ASIC).

A dial tone detector 32 is coupled to the off-hook detector 28 to sense the presence of a dial tone on the communication line. A dial tone detector is essentially a frequency detector which senses the specific frequencies associated with a dial tone. Dial tone detectors are commonly available in standard integrated circuit packages.

A DTMF dialer 34 or tone generator is coupled to the tone detector 32 for dialing a predetermined sequence of numbers in response to a dial tone detected at the dial tone detector 32. The predetermined sequence of numbers is stored in an associated memory 36. DTMF dialers are well known in the art and are widely used in devices connecting to standard telephone circuits with tone dialing capabilities. One example of a single chip DTMF tone generator is manufactured by Gould AMI Semiconductors under the designation of S2569. The dialer 34, as mentioned, is enabled by detection of a dial tone on the phone line. If a dial tone is not detected, however, the dialer 34 will not be activated. Thus, the predetermined dialing sequence will not occur when the user takes the handset off-hook to answer an incoming call.

The memory 36 corresponding to the DTMF dialer 34 will have programmed therein a predetermined sequence of numbers. In the preferred embodiment of the invention, the predetermined sequence of numbers will be a prefix of numbers which is dialed prior to any caller "entered number" in order to access the services of a specific telecommunications carrier. For example, the prefix "10ATT" dialed prior to any valid telephone number will enable a consumer to access the communications network of AT&T for inter-lata as well as some intra-lata calls. As is well known, telephone numbers or addresses to specific calling locations are comprised of a three digit area code and a seven digit local customer number. A prefix dialed before a telephone number having an area code will allow a specific carrier to be accessed on inter-lata and intra-lata calls containing an area code. The same will be true for intra-lata toll calls not including an area code which may be carried by the specific long distance carrier. Local calls within the same area code that cannot be handled by the long distance carrier will be routed through the local carrier and be unaffected by the dialed prefix.

The present invention phone cord dialer allows the communications network of a specific carrier to be automatically and immediately accessed by dialing a specified prefix whenever a caller takes the handset off-hook to make an outgoing call. The caller now need only enter the desired telephone number (long-distance or local) and the call will be completed utilizing the specified carrier where applicable.

In the present embodiment of the invention, depending on how quickly the caller picks up and listens at the handset, the caller may be able to hear the dial tone and any part of the automatically dialed prefix. This is because the dialer module circuitry is wired in parallel with the line. Accordingly, once the automatic dialing sequence is completed, this will be an indication to the caller to begin dialing the intended number. In the alternative, a confirmation tone can be stored in memory and generated by the DTMF dialer after dialing of the predetermined prefix has been completed. The dialer module also includes a disable switch 38 in order that the automatic dialing feature may be disabled if desired.

Figure 3:
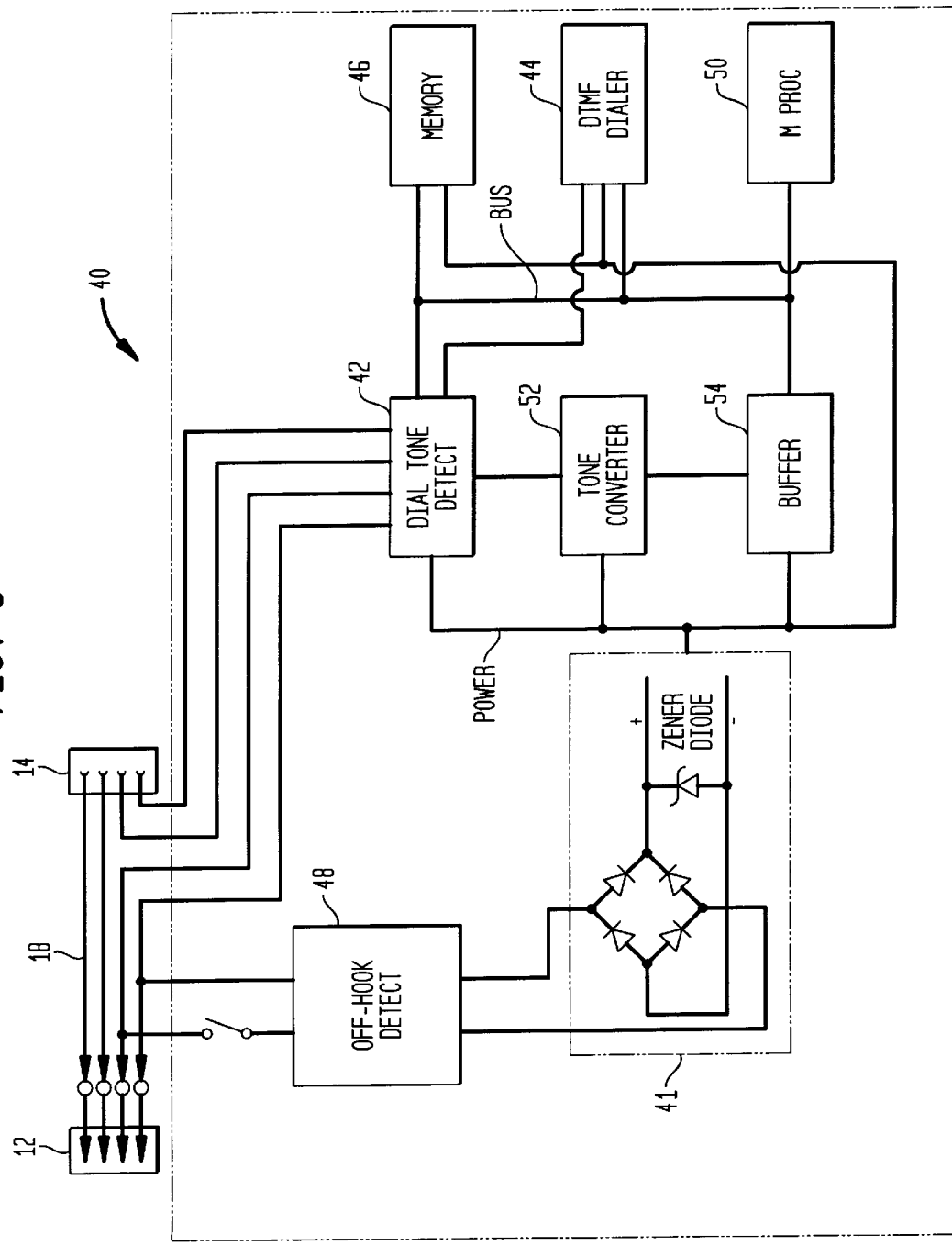
FIG. 3 shows a block diagram of a second preferred embodiment of the present invention automatic dialer module used for incorporating a trap and redial function.

Referring to FIG. 3, there is shown a block diagram of a second preferred embodiment for the present invention automatic dialer 40. The present embodiment auto dialer circuit 40 is similar to that shown with respect to FIG. 2 in that there is included an off-hook detector 48, dial tone detector 42, DTMF dialer 44 and voltage regulator 41, which operate in a similar manner to that previously described. The instant embodiment, however, includes a microprocessor 50 or microcontroller in order that the dialer 40 can be made to perform intelligent functions. For example, memory 46 associated with the processor 50 will be programmed with a software routine which traps the number dialed by the caller and then redials a modified sequence of digits, if necessary. The modified sequence will include the predetermined prefix code for a desired telecommunications carrier, where applicable.

For instance, it is realized that those telephone numbers dialed between different area codes would be eligible to be carried by a long distance carrier and could be accessed by first dialing a prefix. A software routine which counts the number of caller entered digits may be utilized to determine whether the predetermined prefix should be dialed. For example, if 10 digits are dialed (area code+number), then dial a modified sequence containing the prefix; if 7 digits are dialed, and correspond to an intra-lata toll call, then dial a modified sequence containing the prefix; if 7 digits are dialed and correspond to a local non-toll call, then do not modify the dialed number. It will be understood that other routines for determining whether a modified sequence should be dialed are also available and may be utilized in connection with the present invention. For example, all domestic and other related area codes may include either a "1" or a "0" as the second digit therein. Thus, a check routine utilizing this information may be used to quickly determine whether an area code is included in the dialed number and, as such, whether a modified dialing sequence should be implemented. For intra-lata calls not requiring an area code and which may be placed with a long distance carrier, the memory may be regionally programmed to include a routine that recognizes certain exchanges that would be registered as a toll call and which can be carried by the predetermined carrier. Such a scheme would be implemented using a look-up table coded in software to match a specific dialed exchange with those found in software. The dialers would then be distributed on a geographic basis.

In order to implement the intelligent trapping protocol discussed above, the dial tone detector 42 and related circuitry must be placed in series with the communications line. This is necessary in order to temporarily interrupt the line while the dialed number is buffered and it is determined whether a modified number, which includes the predetermined prefix, is to be dialed.

Coupled to the dial tone detector 42 is a tone converter device 52, the converter 52 recognizes the tones entered by the caller and converts these tones into a digital representation. The digital representations are then stored in a buffer memory 54 and the contents of the buffer memory 54 are sequentially processed by the microprocessor 50 to determine whether a modified sequence of numbers needs to be generated. In the alternative, the entire contents of the buffer can be processed after a predetermined period of inactivity from the caller. It will also be understood that a buffering scheme may be utilized with the embodiment described in FIG. 2 in order to eliminate any contention between the number being dialed by the customer and the prefix which is automatically dialed. Contention could occur, for instance, in the previous embodiment if the caller does not wait for the prefix to be completely dialed before beginning to dial a number.

Figure 4:
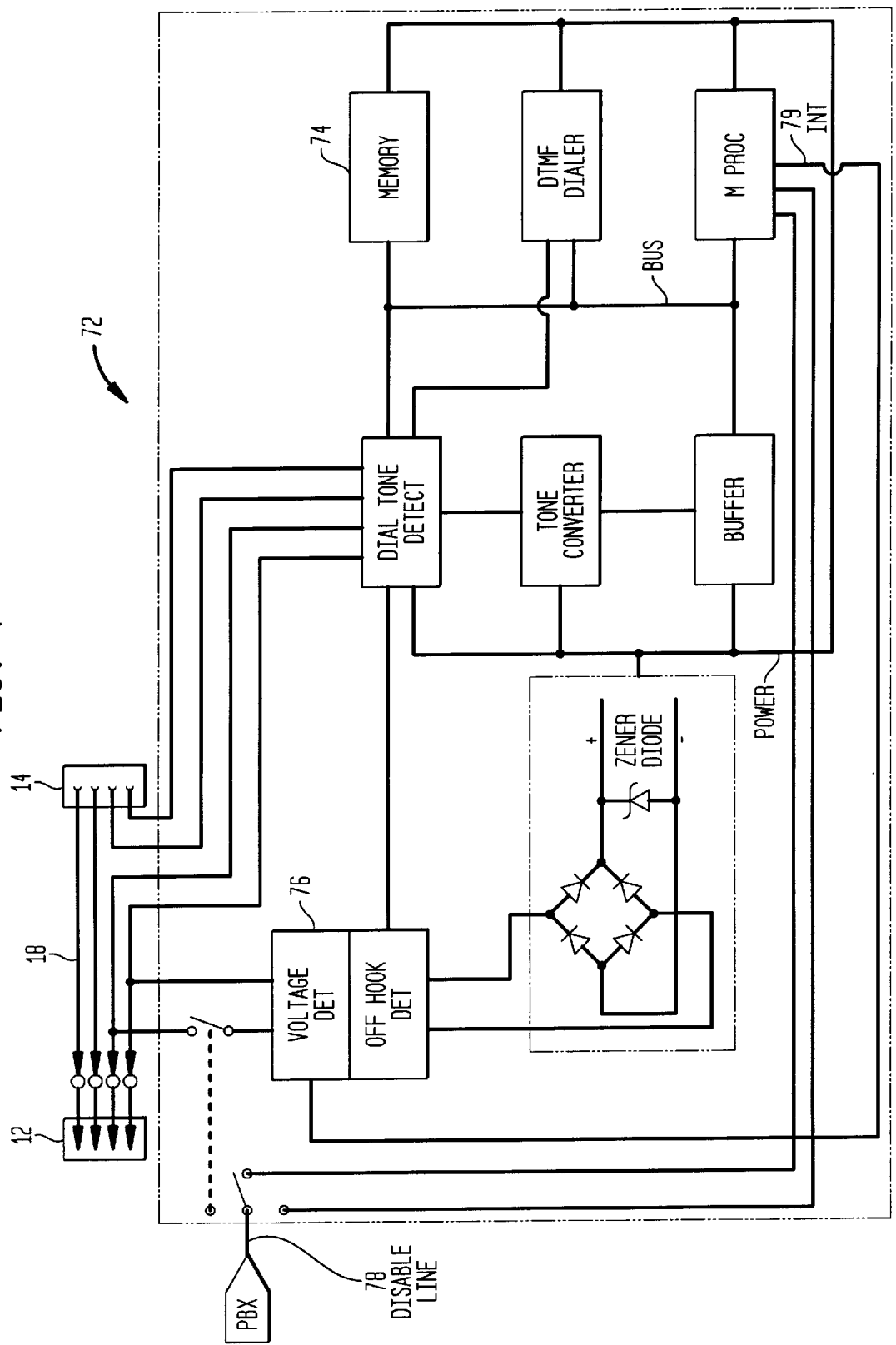
FIG. 4 shows another preferred embodiment of the present invention automatic dialer incorporating non-volatile static RAM and multi-position mode selector.

Referring to FIG. 4, there is shown another embodiment for implementation of the present invention automatic dialer module 72. In order to avoid the problems associated with distribution of regionally dedicated firmware revisions, the instant embodiment incorporates non-volatile random access memory (RAM) 74 which can be downloaded with an appropriate number recognition program that determines whether to implement a modified dialing sequence. The device includes a voltage detector 76 which would be incorporated along with the off-hook detector. The voltage detector 76 recognizes the first time the dialer module 72 is connected into a working line and initiates a dial-up procedure from the microprocessor via an interrupt line 79. A pre-programmed number, for example an "800" number, is dialed connecting to the central office of the long distance carrier, wherein the origin of the call is determined by means of a Automatic Number Identification. The appropriate number recognition program, or data supporting such a program, can then be downloaded in a known manner according to the geographic location of the call. This program will remain undisturbed in the non-volatile RAM until such a time as the voltage applied at the voltage detect circuit is interrupted, for example, by disconnecting the dialer module 74 from the phone line. Upon reconnection of the dialer module into another working line, the dial-up procedure will be repeated. By utilizing the dial-up initialization scheme discussed above, pertinent local exchange information can be downloaded in order that a caller may take full advantage of the benefits associated with the specific carrier.

Heretofore, the present invention dialer modules have been intended for use only on private subscriber lines having a direct connection between the telephone and an outside line at a central switching office. Many other applications exist for use in localized telephone switching networks utilizing keyed telephone sets. These key telephone sets may be part of a private branch exchange (PBX), wherein an access code must first be dialed to be connected with an outside line. The present embodiment dialer module 72 incorporates recognition of a carrier access code which can be dialed subsequent to accessing an outside line. For example, many internal phone systems require a caller to dial "9" in order to become connected to an outside line. The present embodiment allows for the entering of a carrier access code, for example, the "#" key, after connection to an outside line in order to initiate the trap and redial protocol previously discussed in regard to FIG. 3. It will be understood, however that many larger PBX systems automatically take care of call routing and that certain dialing sequences may be blocked from use. Therefore, the present invention dialer may not be suitable for use with all systems.

As mentioned with respect to the embodiment described in FIG. 2 the dialer may issue a confirmation tone to the user after automatically dialing the prefix code. In the present embodiment the interface between the user and the central office is intended to be as transparent as possible. There may, however, be a slight delay while the processor buffers the dialed number and determines whether to implement a modified dialing sequence. In this case a very short voice message could be played to the caller, for example, "Attempting to complete your call through AT&T." Standard voice synthesizer chips programmed with pre-recorded messages, similar to those utilized with greeting cards, would be utilized for implementation of such scheme.

The dialer module 72 of FIG. 4 includes a three position switch 78 in order that the device may be disabled if necessary. Two other positions on the switch refer to the modes of operation, i.e., 1) connection to an outside line or 2) through a PBX. When the switch position indicates outside line, the dialer module operates in the automatic trap and redial mode as discussed with respect to FIG. 3. When the switch position is switched to PBX, the module will wait for a carrier access code to be entered before implementing the trap and redial protocol.

Although the automatic dialers 22, 40, 72 embodied in the figures are described in connection with a phone cord, it will be understood that the present invention dialer may take on any form or be included within any device which is coupled in series between a telephone and associated phone line. For instance, the dialer may be incorporated into the phone jack itself or as an adapter connectable within the base of the telephone. Moreover, since the present invention phone cord 10 would need to be connected individually to very telephone extension where telephone service is present, it may be desirable to adapt the dialer module to be installed at a centralized point on the incoming phone line before the line branches off.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. In a telephone system utilizing two part number addresses, wherein a first part address corresponds to one of a plurality of prefix codes, each for accessing an associated one of a plurality of telecommunications carriers, and a second part address corresponds to a specific call destination, a dialing device for direct coupling between a telephone set and outside telecommunications line connected to a central switching office, said device comprising:
   a telephone cord adapted for connection between a telephone set and a phone jack receptacle; and
   a dialer circuit coupled to said telephone cord for automatically dialing a partial address corresponding to a single one of said prefix codes upon recognizing placement of an outgoing call, wherein said single one is dialed each time without selection from a user upon recognition of any outgoing call.

2. The device of claim 1, wherein said dialer circuit includes a DTMF tone generator for dialing of said predetermined prefix code.

3. The device of claim 1, wherein said dialer circuit includes an off-hook detector for detecting an off-hook condition at said telephone set.

4. The device of claim 3, wherein said dialer circuit further includes a dial tone detector for detecting when a dial tone is present on said outside telecommunications line.

5. The device of claim 1, wherein said dialer circuit includes a voltage regulator for regulating a voltage from said outside telecommunications line said regulated voltage being used to provide power to said dialing circuit.

6. The device of claim 1, wherein said dialer circuit includes a memory for storing said first part address predetermined prefix code.

7. The device of claim 1, wherein said dialer circuit further includes a processor for performing selective dialing of said prefix codes according to a number recognition program stored in memory.

8. The device of claim 7, wherein said dialer circuit buffers said second part address and thereafter automatically dials a modified sequence of numbers including said first part address and said second part address whenever said processor determines that said associated one of said plurality of telecommunications carriers may be utilized.

9. The device of claim 1, wherein said dialer circuit generates a confirmation tone to a user subsequent to dialing of said predetermined prefix code.

10. The device of claim 1, wherein said dialer circuit is integrally packaged as a single chip applications specific integrated circuit (ASIC).

11. The device of claim 1, wherein said dialer circuit includes a switch for selectively disconnecting said dialing circuit from said telecommunications line.

12. The device of claim 1, wherein said telephone cord includes first and second connectors disposed at opposite ends thereof, said connectors adapted to be received into a telephone cord receptacle.

13. The device of claim 7, wherein said dialer circuit recognizes a carrier access tone generated by a user from the keypad of said telephone set, wherein said access tone initiates said selective dialing of said prefix codes to thereby enable use of said device in localized customer switching networks.

14. The device of claim 8, wherein said dialer circuit is electrically coupled in series with said telecommunications line and is adapted to temporarily interrupt said line while determining whether said modified sequence of numbers will be dialed.

15. The device of claim 8, wherein said dialer circuit is operable to generate a predetermined voice message during completion of said outgoing call.

16. The device of claim 8, wherein said dialer circuit automatically dials a predetermined number upon power-up on said telecommunications line, wherein said second part address associated with said dialer circuit is identified and said number recognition program is downloaded into memory of said dialer circuit, wherein said number recognition program identifies inter-lata and non-local intra-lata outgoing calls.

17. An apparatus located proximate to a subscriber telephone for connecting between a telephone set and an outside phone line that leads to a central switching office, said apparatus being activated, exclusively upon recognizing placement of all ongoing calls and comprising:
   dialer means for automatically dialing a predetermined sequence of numbers for insertion as a prefix to a caller entered number, said prefix being an access code for accessing a particular one of an available plurality of telecommunications carriers, which is dialed each time without selection from a user; and
   processing means operative to trap and store said caller entered number and selectively insert said prefix according to parameters of a number recognition program for said caller entered number, wherein said parameters of said number recognition program determine if said outgoing call is an inter-lata call and a non-local intra-lata call.

18. The apparatus of claim 17, wherein said dialer means includes a DTMF tone generator for dialing of said predetermined sequence of numbers.

19. The apparatus of claim 17, wherein said dialer means includes a dial tone detector for detection of a dial tone on said phone line, whereby an outgoing call may be defined by detection of said dial tone at said dial tone detector.

20. The apparatus of claim 19, wherein said dialer means includes off-hook detector means for sensing an off-hook condition from a telephone set coupled to said apparatus.

21. The apparatus of claim 20, further including a voltage regulator wherein said voltage regulator enables said dialer means to be powered from a phone line.

22. The apparatus of claim 18, wherein said apparatus is a phone cord adapted to interconnect a telephone set and a phone jack receptacle.

23. The apparatus of claim 17, wherein said dialer means is adapted to automatically dial said prefix in response to a dial tone present on a phone line.

24. The apparatus of claim 17, wherein said dialer means is electrically coupled in series with a phone line, said dialer means being adapted to temporarily interrupt said line while determining whether a modified sequence of numbers will be dialed.

25. The apparatus of claim 24, wherein said dialer means automatically dials a predetermined number at a central office upon power-up on said phone line, wherein an address associated with said dialer means is identified by said central office and said number recognition program is downloaded into memory.

26. The apparatus of claim 25, wherein said dialer means is operative to generate a prerecorded voice message to a caller during said trap and store operations.

* * * * *